United States Patent
Al-Naib

(10) Patent No.: US 11,402,324 B2
(45) Date of Patent: Aug. 2, 2022

(54) SYSTEM FOR BIOMOLECULE IDENTIFICATION BY TERAHERTZ SENSING

(71) Applicant: Imam Abdulrahman Bin Faisal University, Dammam (SA)

(72) Inventor: Ibraheem Abdalwahhab Ibraheem Al-Naib, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 17/237,205

(22) Filed: Apr. 22, 2021

(65) Prior Publication Data
US 2021/0239611 A1 Aug. 5, 2021

Related U.S. Application Data

(63) Continuation of application No. 16/416,926, filed on May 20, 2019, now Pat. No. 11,041,802.

(51) Int. Cl.
*G01N 21/3581* (2014.01)

(52) U.S. Cl.
CPC ............................... *G01N 21/3581* (2013.01)

(58) Field of Classification Search
CPC .................. G01N 21/3581; G01N 21/3586
See application file for complete search history.

(56) References Cited

U.S. PATENT DOCUMENTS

| 8,921,789 B2 | 12/2014 | Pryce et al. | |
| 2021/0239611 A1* | 8/2021 | Al-Naib | G01N 21/3586 |

FOREIGN PATENT DOCUMENTS

| CN | 105602840 A | 5/2016 |
| CN | 108507969 A | 9/2018 |
| KR | 1891213 B1 | 8/2018 |

OTHER PUBLICATIONS

Singh, et al. ; Ultrasensitive THz sensing with high-Q Fano resonances in metasurfaces ; Jun. 27, 2014 ; 20 Pages.
(Continued)

*Primary Examiner* — David P Porta
*Assistant Examiner* — Meenakshi S Sahu
(74) *Attorney, Agent, or Firm* — Oblon, McClelland, Maier & Neustadt, L.L.P.

(57) ABSTRACT

A system for biomolecule identification by terahertz sensing, an asymmetric triple split-rectangular (ATSR) metamaterial biosensor, and a method for biomolecule identification by terahertz sensing are presented. The asymmetric triple split-rectangular (ATSR) metamaterial biosensor includes three gap areas which highly confine an electric field. The biosensor includes an E-shaped structure facing an inverted E-shaped structure with gaps between the respective legs. Each leg has a specially designed extension on either side which increases the electric field. A terahertz laser interrogates an analyte upon the metamaterial structure with a plurality of frequencies. The amplitude difference is estimated by an amplitude difference referencing technique. The amplitude difference is matched to a database record to identify the biomolecule analyte. The asymmetric triple split-rectangular (ATSR) metamaterial biosensor in combination with the amplitude difference referencing technique detects the type of biomolecule with a high degree of accuracy and requires only small analyte samples with sub-micron thicknesses.

10 Claims, 12 Drawing Sheets

(56) References Cited

OTHER PUBLICATIONS

Lopez, et al. ; Design of THz Metasurfaces for Thin-film sensing ; Sep. 20, 2018 ; 77 Pages.
Yu, et al. ; The potential of terahertz imaging for cancer diagnosis: A review of investigations to date ; Quantitative Imaging in Medicine and Surgery ; Jan. 17, 2012 ; 19 Pages.
Sacher Lasertechnik ; CW THz Laser; Apr. 25, 2019 ; Product ; 2 Pages.
CST ; CST Microwave Studio ; EM Simulation Software ; Apr. 24, 2019 ; 2 Pages.
GENTEC-EO ; THZ9D-20MS-BL-DO ; Apr. 25, 2019 ; Product I 2 Pages.
Wellenzohn et al. "A theoretical design of a biosensor device based on split ring resonators for operation in the microwave regime," Procedia Engineering 120 (2015) 865-869 (Year: 2015).

\* cited by examiner

100

SYSTEM FOR BIOMOLECULE IDENTIFICATION BY TERAHERTZ SENSING

CROSS-REFERENCE TO RELATED APPLICATIONS

The present application is a Continuation of Ser. No. 16/416,926 having a filing date of May 20, 2019.

Aspects of this technology are described in an article "Evaluation of amplitude difference referencing technique with terahertz metasurfaces for sub-micron analytes sensing" published in Journal of King Saud University—Science, DOI: 10.1016/j.jksus.2018.11.011, on Nov. 28, 2018, which is incorporated herein by reference in its entirety.

BACKGROUND

Technical Field

The present disclosure is directed to an asymmetric triple split-rectangular (ATSR) metamaterial biosensor for sub-micron thickness analyte identification at terahertz frequencies. The frequency response is post-processed by an amplitude difference referencing technique.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The past two decades have revealed a plethora of terahertz (THz) applications emerging from several fields of science. (See Jepsen, P.U., Cooke, D.G., Koch, M., 2011. "Terahertz spectroscopy and imaging-modern techniques and applications". Laser Photon. Rev. 5, 124-166; and Tonouchi, M., 2007. Cutting-edge terahertz technology. Nat. Photon. 1, 97-105, each incorporated herein by reference in their entirety). Applying terahertz technology in the biomedical context has invoked considerable interest, as rich spectroscopic features, such as collective structural vibrational modes of proteins and DNA are found to exist at these frequencies. (See Al-Naib, I., 2017. "Biomedical sensing with conductively coupled terahertz metamaterial resonators". IEEE J. Sel. Top. Quantum Electron. 23, 4700405; Baras, T., Kleine-Ostmann, T., Koch, M., 2003. "On-chip THz detection of biomaterials: a numerical study". J. Biol. Phys. 29, 187-194; Markelz, A.G., 2008. "Terahertz dielectric sensitivity to biomolecular structure and function". IEEE J. Sel. Top. Quantum Electron. 14,180-190, each incorporated herein by reference in their entirety).

Further, label-free identification of various biomedical analytes with terahertz waves has been proposed. (See Nagel, M., Richter, F., Haring-Bolivar, P., Kurz, H., 2003. "A functionalized THz sensor for marker-free DNA analysis". Phys. Med. Biol. 48, 3625-3630; and O'Hara, J. F., Withayachumnankul, W., Al-Naib, I., 2012. "A review on thin-film sensing with terahertz waves". J. Infrared Millimeter Terahertz Waves 33,245-291, each incorporated herein by reference in their entirety). This technique improved over previous testing methods, in which the unidentified analyte was labeled with fluorescent molecules. Apart from requiring an additional preparation step, which restricted the speed- and cost-efficiency, the analyte conformation may be altered in the labeling process, lowering the yield and reliability of the method. (See Fischer, B. M., Walther, M., Uhd Jepsen, P., 2002. "Far-infrared vibrational modes of DNA components studied by terahertz time-domain spectroscopy". Phys. Med. Biol. 47, 3807-3814; and Mickan, S. P., Abbott, D., Munch, J., Zhang, X.-C., 2002. "Noise reduction in terahertz thin film measurement using a double modulated differential technique", Fluct. Noise Lett. 2, R13-R28, each incorporated herein by reference in its entirety).

Realizing the potential of label-free tests at terahertz frequencies has been a challenging task due to the large difference between the sensing wavelength (0.3 mm at 1 Thz) when it is compared with the thickness of a tiny quantity of analyte (in nanometers). In order to access the desired information, thin-film sensors with very high sensitivity must be developed. There have been several approaches introduced in recent years, but the various techniques suffer from limitations, such as low frequency response, thickness of films, low quality-factor, etc. (See Al-Naib, I., Withayachumnankul, W., 2017. "Recent progress in terahertz metasurfaces". J. Infrared Millimeter Terahertz Waves 38, 1067-1084; Gupta, M., Srivastava, Y. K., Manjappa, M., Singh, R., 2017. "Sensing with toroidal metamaterial". Appl. Phys. Lett. 110, 121108; O'Hara, J. F., Singh, R., Brener, I., Smirnova, E., Han, J., Taylor, A. J., Zhang, W., 2008. "Thin-film sensing with planar terahertz metamaterials: sensitivity and limitations". Opt. Express 16, 1786-1795; and O'Hara, "A review on thin-film sensing with terahertz waves" (2012); and Withayachumnankul, W., O'Hara, J. F., Cao, W., Al-Naib, 1., Zhang, W., 2014. "Limitation in thin-film sensing with transmission-mode terahertz time-domain spectroscopy". Opt. Express 22, 972, each incorporated herein by reference in their entirety).

For thin-film sensors to function efficiently, the frequency response must show a sharp transition to allow the recognition of small changes in the frequency response due to the modification in the dielectric environment. Conventionally, the steepness of this transition has been considered as a direct measure of the sensor sensitivity. (See Singh, R., Cao, W., Al-Naib, I., Cong, L., Withayachumnankul, W., Zhang, W., 2014. "Ultrasensitive terahertz sensing with high-Q Fano resonances in metasurfaces". Appl. Phys. Lett. 105, 171101, incorporated herein by reference in its entirety).

Planar metamaterials or metasurfaces can be considered as filters of electromagnetic waves and consist of two-dimensional arrays of identical metallic resonators. The metamaterials are formed as a rectangular or circular ring with a gap. When THz radiation is applied to the sensor, an electric field develops within the gap. This field can be detected by spectral imaging. (See Al-Naib, I., Jansen, C., Singh, R., Walther, M Koch, M., 2013. "Novel THz metamaterial designs: from near- and far-field coupling to high-Q resonances". IEEE Trans. Terahertz Sci. Technol. 3, 772-782; Fedotov, V. A., Rose, M., Prosvirnin, S. L., Papasimakis, N., Zheludev, N. I., 2007. "Sharp trapped-mode resonances in planar metamaterials with a broken structural symmetry". Phys. Rev. Lett. 99, 147401, each incorporated herein by reference in their entirety).

A drawback of traditional designs is the strong free-space coupling of the structural elements, which induces high radiation losses, resulting in lower quality (Q-) factors of the devices. Different designs have been investigated in order to suppress the radiation losses, and one approach utilized the asymmetric sub-radiant Fano resonance excited by breaking the symmetry of a double-split ring resonator. (See Fedotov et al. (2007); and Singh, R., Al-Naib, 1.A.1., Koch, M., Zhang, W., 2011a. "Sharp Fano resonances in THz metamaterials. Opt. Express" 19, 6312-6319; Al-Naib, I., Hebestreit, E., Rockstuhl, C., Lederer, F., Christodoulides, D Ozaki, T., Morandotti, R., 2014. "Conductive coupling of split ring resonators: a path to THz metamaterials with ultrasharp resonances". Phys. Rev. Lett. 112, 183903; Singh, R., Al-Naib, I. A. I., Yang, Y., Roy Chowdhury, D., Cao, W., Rockstuhl, C., Ozaki, T., Morandotti, R., Zhang, W., 2011b. "Observing metamaterial induced transparency in individual Fano resonators with broken symmetry". Appl. Phys. Lett. 99, 201107, each incorporated herein by reference in their entirety).

Sharp Fano resonances have been found to be excited by means of metasurfaces consist of asymmetric split-rectangular resonators (ASRs). After applying the analyte onto the sensor surface, the resonance red-shifted due to the dielectric environment alteration. This shift of the resonance frequency was considered as a measure of the refractive index, i.e. the analyte type and its thickness. After measuring the frequency response, the results were normalized to the frequency response of a bare substrate. Measurable results were achieved when the analyte thin-film refractive index was 1.6 with a thickness of one micron or larger. For instance, a frequency shift of 10 GHz at a resonance frequency of 0.52 THz was achieved when the analyte thickness was one micron and the shift increased to 29 GHz at analyte thickness of 16 µm where it is eventually saturated. In order to enable sensing of analytes with a thickness less than one micron, there have been attempts to address this problem by using membranes or a very low dielectric constant substrate in reflection mode. (See Chen, Y., Al-Naib, I. A. I., Gu, J., Wang, M., Ozaki, T., Morandotti, R., Zhang, W., 2012. "Membrane metamaterial resonators with a sharp resonance: a comprehensive study towards practical terahertz filters and sensors". AIP Adv. 2, 22109; Tao, H., Strikwerda, A.C., Liu, M., Mondia, J. P., Ekmekci, E., Fan, K., Kaplan, D. L., Padilla, W. J., Zhang, X., Averitt, R. D., Omenetto, F. G., 2010. "Performance enhancement of terahertz metamaterials on ultrathin substrates for sensing applications". Appl. Phys. Lett. 97, 261909; and Reinhard, B., Schmitt, K. M., Neu, J., Beigang, R. R., Rahm, M., Wollrab, V., 2012. "Metamaterial near-field sensor for deep-subwavelength thickness measurements and sensitive refractometry in the terahertz frequency range". Appl. Phys. Lett. 100, 221101; Yu et al., "The potential of terahertz imaging for cancer diagnosis: A review of investigations to date", Quant Imaging Med Surg. 2012 March; 2(1): 33-45, each incorporated herein by reference in their entirety).

However, these extra preparation conditions hinder the achievement of high throughput thin-film sensors. Moreover, it is highly desirable to have a fast process for the whole sensing procedure. Hence, the measurement scan time should be minimized as much as possible. Current practices use long scan times carried out by the THz spectrometers. These long scan times have been considered essential to achieving the required resolution in the frequency domain in order to discern close points. For instance, a 200 ps scan time is required to achieve 5 GHz resolution in the frequency domain.

Further, it would be desirable to utilize standard photolithography along with transmission mode spectroscopy to enable the discernment of the resonance shift when the analyte thickness is less than one micron at a reasonable scan time.

Aspects of the present disclosure present a solution to the problems presented above by a method of biosensing analysis including an amplitude difference referencing technique (ADRT), which allows detection of resonance shifts for analyte thicknesses of 0 to 2 µm. Further, a new biosensor probe is presented which provides comparable results with only about 20% of the amount of biomaterial needed for analysis using conventional methods.

SUMMARY

In an exemplary embodiment, a system for biomolecule identification by terahertz sensing, comprising an asymmetric triple split-rectangular (ATSR) metamaterial biosensor having a metamaterial structure formed on a substrate, the metamaterial structure including three mutually opposed gaps. The structure includes a receiving region for an analyte to be deposited on the metamaterial structure. The system includes a terahertz radiation source having a range of frequencies for interrogating the asymmetric triple split-rectangular metamaterial biosensor and a terahertz receiver for receiving electrical signals that are modified by the analyte at the gaps. A database record stores a list of resonant frequencies for a plurality of different analyte types. A controller has circuitry configured to cause the terahertz radiation source to project terahertz radiation at a range of frequencies onto the unknown analyte, receive the terahertz frequency response from the receiver, and determine the resonant frequency from the frequency responses of the asymmetric triple split-rectangular metamaterial biosensor by an amplitude difference referencing technique, and match the resonant frequency to the database record to identify the analyte type.

In another exemplary embodiment, an asymmetric triple split-rectangular (ATSR) metamaterial biosensor is disclosed, comprising a first E shaped sensor part deposited upon a substrate, the first E shaped sensor having three evenly spaced legs each of length l; a second inverted E shaped sensor part deposited upon the substrate, the second inverted E shaped sensor part having three evenly spaced legs each of length k, where l is greater than k and the sum of l and k is less than the width of the biosensor. Each leg of the first E shaped sensor part includes a first end connected at a right angle to a back of the E shape and a second end having two perpendicular extensions in the plane of the sensor. Each leg of the second inverted E shaped sensor part includes a third end connected at a right angle to a back of the inverted E shape and a fourth end having two perpendicular extensions in the plane of the sensor. The extension end of each leg of the E shaped sensor mutually opposes the extension end of a corresponding leg of the inverted E shaped sensor; and each extension end of the E shaped sensor is separated from the corresponding extension end of the inverted E shaped sensor by a gap.

In another exemplary embodiment, a method for biomolecule identification by terahertz sensing is described, comprising transmitting, by a terahertz light source, a terahertz wave in a range of frequencies to an asymmetric triple split-rectangular metamaterial biosensor which may be loaded with an analyte, receiving, by a terahertz receiver, a frequency response from the biosensor; transmitting the frequency response from the terahertz receiver to a sensor control system, wherein the sensor control system includes a controller having processing circuitry configured for analyzing the frequency response by an amplitude difference referencing technique to determine a resonant frequency; and identifying the analyte type by matching the resonant frequency to a database record.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
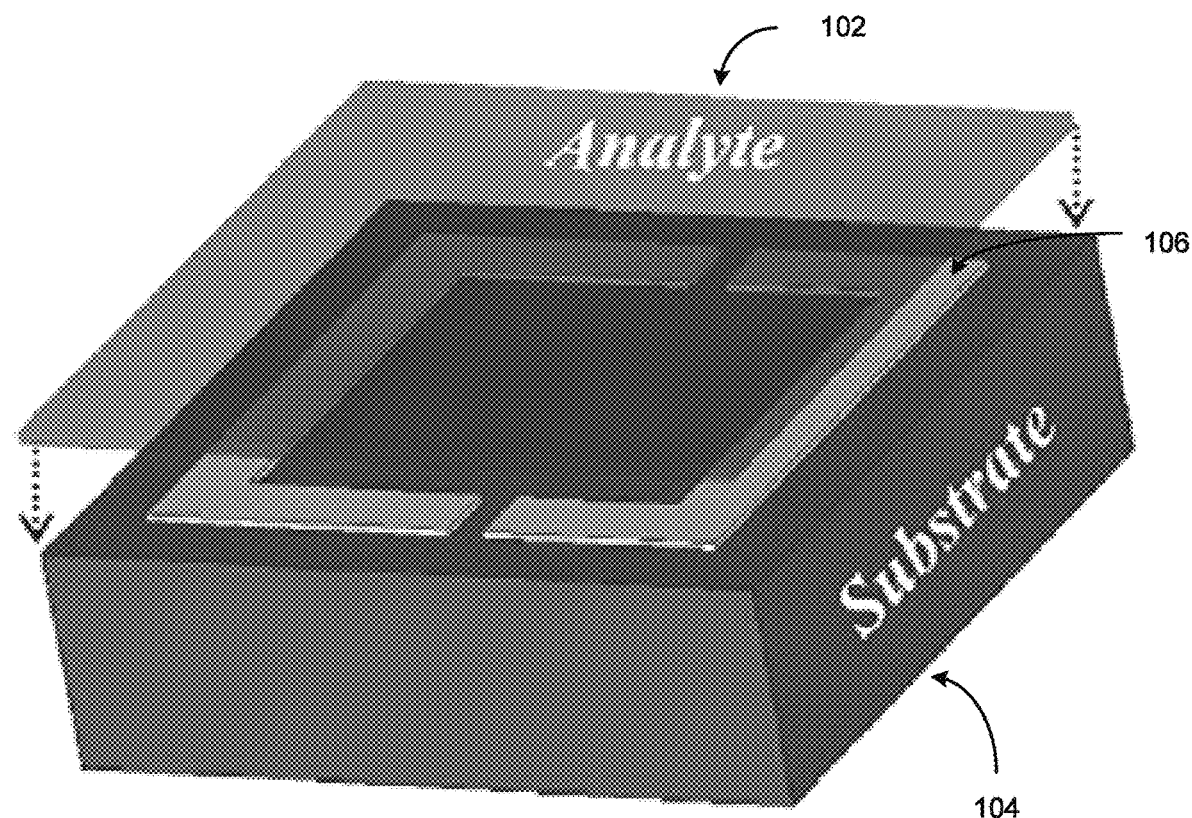
FIG. 1A illustrates a schematic of a conventional metasurface unit cell.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values there between.

Terahertz radiation has frequencies of 0.1 to 30 terahertz on the spectral scale. One terahertz is $10^{12}$ Hz or 1000 GHz. Wavelengths of radiation in the terahertz band correspondingly range from 1 mm to 100 μm. The terahertz region lies between the microwave and infrared regions of the electromagnetic spectrum and is strongly attenuated by water and very sensitive to water content. The presence of cancer often causes increased blood supply to affected tissues and the increase in tissue water content acts as a natural contrast mechanism for terahertz imaging of cancer. The increased water content increases the refractive index of the biomaterial and influences the resonant frequency of measurements. Because of these characteristic properties, terahertz imaging for biological applications and terahertz spectra is a valuable tool for identifying biomolecules, including cancer cells.

The top surface of the metamaterial is covered with a thin layer of analyte in order to examine various sensing parameters. The sensitivity and corresponding figure of merit (FoM) of the odd and even resonant modes are analyzed with respect to coated analyte films. In a non-limiting example, the analyte may be a thin film with a coating of a cancer biomolecule. In a further non-limiting example, the analyte may be a film coated with blood containing AIDS biomolecules. Alternatively, the analyte may be a layer of biomolecule material placed upon the sensing domain of the sensor and does not need to be placed on a film carrier.

When an unidentified biomolecule analyte has sub-micron thickness, the sample volume is very small, resulting in a very low amplitude signal response, therefore the identification of sub-micron thickness biomolecules is a challenging task. Therefore, a sensor known as an asymmetric split-rectangular (ASR) metamaterial biosensor (referred to as the conventional sensor in the present disclosure, see FIG. 1A), having gold electrodes separated by gaps has been used to enhance the frequency response. Upon applying an analyte to the sensor surface, the resonant frequency is red-shifted due to the dielectric environment alteration. This shift of the resonance frequency is considered as a measure of the refractive index, which is related to the analyte type and its thickness. The amplitude of the frequency response is very small and previous methods of analysis have suffered in accurate identification of samples less than 2 μm in thickness. Further, this biosensor is not able to accurately measure the frequency response of very small samples of analyte less than 2 μm in thickness.

Aspects of this disclosure are directed to a system for biomolecule identification by terahertz sensing, an asymmetric triple split-rectangular (ATSR) metamaterial biosensor, and method for biomolecule identification by terahertz sensing.

In the first aspect, a system for biomolecule detection by terahertz sensing is described. The system uses an asymmetric triple split-rectangular (ATSR) metamaterial biosensor upon which a sub-micron thickness analyte is placed. The resonant response is analyzed by an amplitude difference referencing technique (ADRT). Correlation of the resonant frequency against the refractive indices of corresponding biomolecules of the same thickness identifies a particular biomolecule, such as a cancer cell.

In a further aspect, the present disclosure describes a system for the evaluation of thin-films in semiconductor fabrication processes by terahertz sensing.

In one aspect, the conventional sensing cell as shown in FIG. 1A is subjected to a terahertz radiation and the ADRT is used to measure the response.

In another aspect, the asymmetric triple split-rectangular (ATSR) metamaterial biosensor of the present disclosure is subjected to terahertz radiation and the ADRT is used to measure the response.

In an aspect, a method for biomolecule detection includes using an amplitude difference referencing technique (ADRT) to determine the frequency response by interrogating the analyte covered surface of an ASR or an ATSR with terahertz radiation. An uncoated metamaterial sensor provides a reference frequency response. The sensitivity level using the conventional method of normalization by dividing an analyte coated metasurface transmission amplitude response by its bare substrate counterpart response is compared to the sensitivity level using the ADRT. The ADRT is determined by subtracting the frequency response of the coated metasurface from the frequency response of the uncoated metasurface structure.

Figure 1B:
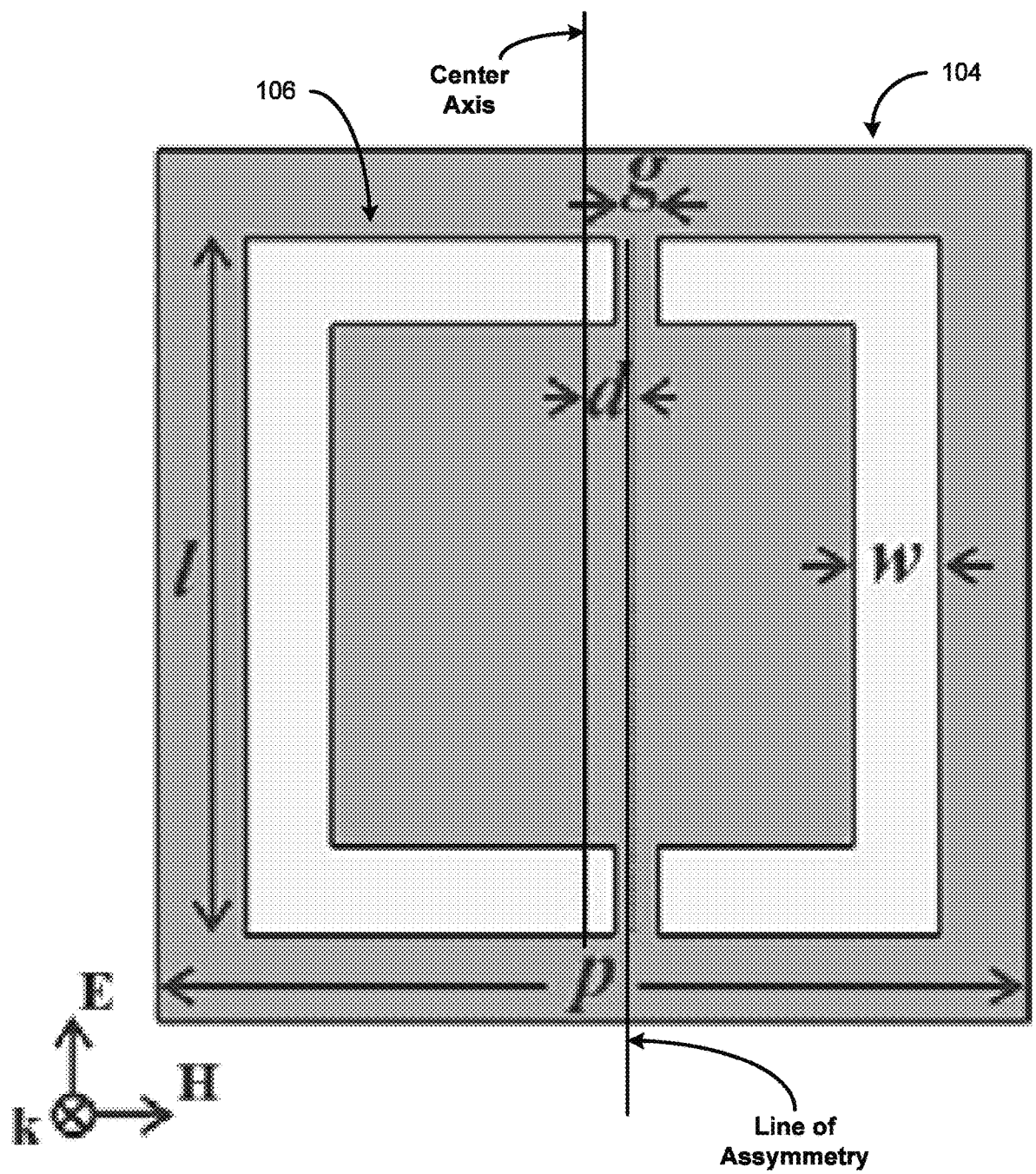
FIG. 1B illustrates an asymmetric double split-rectangular (ASR) metamaterial unit cell with detailed geometric dimensions.

The conventional metasurface unit cell consists of double-split rectangular asymmetric metal resonators 106 deposited on top of a dielectric substrate 104. As shown in FIG. 1A, a 3D view of the asymmetric double split-rectangular (ASR) metamaterial unit cell is shown with an analyte layer applied to the metasurface sensor. The analyte 102 is applied to the metallized side and covers the entire metallized area. FIG. 1B shows the geometrical dimensions of the asymmetric split-rectangular resonator unit cell. In a non-limiting example, the geometrical dimensions of the resonator used for simulation are: a side length of l=80 µm, a microstrip line width of w=10 µm, a gap of g=5 µm, an asymmetry distance from the center line of d=5 µm, and a periodicity of p=100 µm. The refractive index of the high resistivity silicon substrate wafer is 3.42. The thickness of the gold metallized metamaterial resonators is 200 nm from the top of the silicon substrate. Alternatively, the substrate may be a sapphire wafer.

Each resonator in the metamaterial is composed of a metallic loop with a split. Upon excitation by an incident terahertz wave, this resonator exhibits a Lorentzian resonance response. This response is analogous to that obtainable from a lumped RLC circuit with capacitance C and inductance L approximately determined by the properties of the dielectric gap and the metallic loop, respectively. Upon resonance, a collection of charge is strongly established at the dielectric gap, which results in the oscillating current in the loop and the strong electric field across the gap. This confined electric field is highly sensitive to a change in the surrounding material. Samples that are placed in the modify the capacitance of the ring, causing a shift in the resonance frequency. Since the gap region is very small and the metamaterial structure is highly resonant, only small sample amounts are necessary to invoke a measurable change.

Simulations were conducted using frequency domain solver simulation software. In a non-limiting example, the frequency domain solver simulation software is the Computer Simulation Technology (CST) Microwave Studio by Dassault Systemes, 175 Wyman St., Earth Building, Waltham, Mass. 02451, U.S., https://www.cst.com/products/cstmws, incorporated herein by reference in its entirety), which is based on the finite integration technique. Periodic boundary conditions have been utilized to mimic the actual configuration and normal incidence plane wave excitation has been applied. Since the electric field is oriented perpendicular to the two gaps, as indicated in the inset of FIG. 1B, an asymmetric sharp Fano resonance as well as a symmetric dipole resonance are excited.

In physics, a Fano resonance is a type of resonant scattering phenomenon that gives rise to an asymmetric line-shape. Interference between a background and a resonant scattering process produces the asymmetric line-shape.

Conventionally, three sets of data are measured in the time-domain for: (i) a bare substrate, (ii) uncoated metasurface structure, and a (iii) coated metasurface after depositing an analyte on top of the metasurface structure. After converting the measured data to the frequency domain, the latter two responses are normalized to the response of the bare substrate.

Figure 2A:
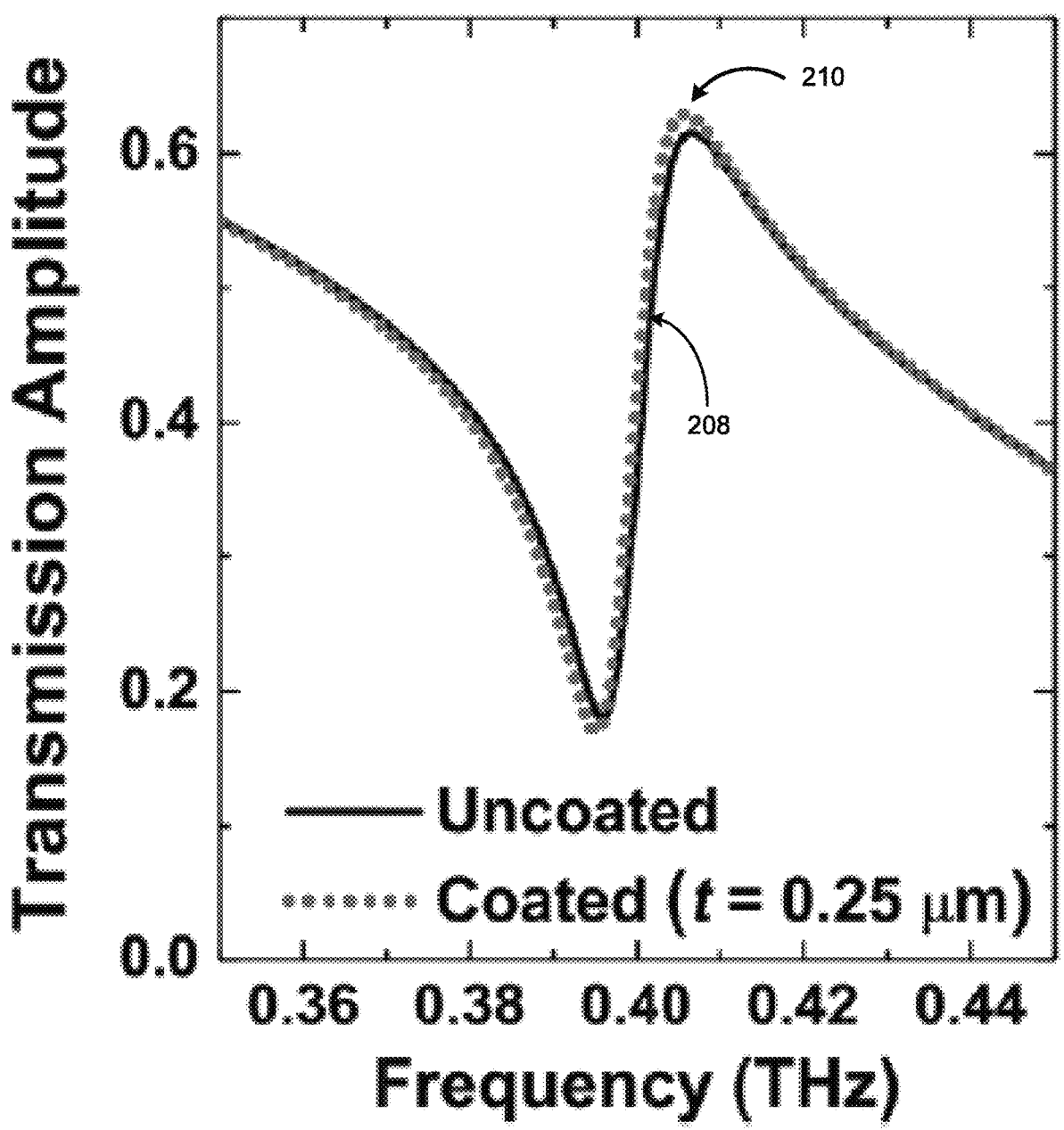
FIG. 2A is a graph illustrating the transmission amplitude spectra of the uncoated and coated metasurface with 0.25 μm thick analyte using the conventional normalization method.

FIG. 2A shows an example of using the conventional analysis method to determine the normalized uncoated metasurface frequency response (solid line 208). The Fano asymmetric resonance is at 0.396 THz and the dipole resonance is at 0.7 THz (not shown). The spectral response of the Fano resonance features a small bandwidth of 34 GHz and therefore the quality factor (defined as resonance frequency/bandwidth) of this resonance is almost 12 for the given configuration. After an analyte thickness of 0.25 µm is applied on top of the metasurface, the frequency response (dotted line 210) normalized to the bare substrate is red-shifted by 1 GHz to 0.395 THz as shown in FIG. 2A. This red-shift in the frequency response is a consequence of the alteration in the dielectric environment of the resonators. The shift/refractive index unit is 1 GHz/(1.6−1.0)=1.67 GHz/RIU (refractive index unit), which represents a very low sensitivity. As shown in FIG. 2A, this difference is not measurable with any practical degree of accuracy, thus cannot be used to measure submicron analyte thicknesses. Further, it is important to note that this very small red-shift requires a minimum of 1000 ps scan time measurements in order to discern the coated sample response from the uncoated one.

Figure 2B:
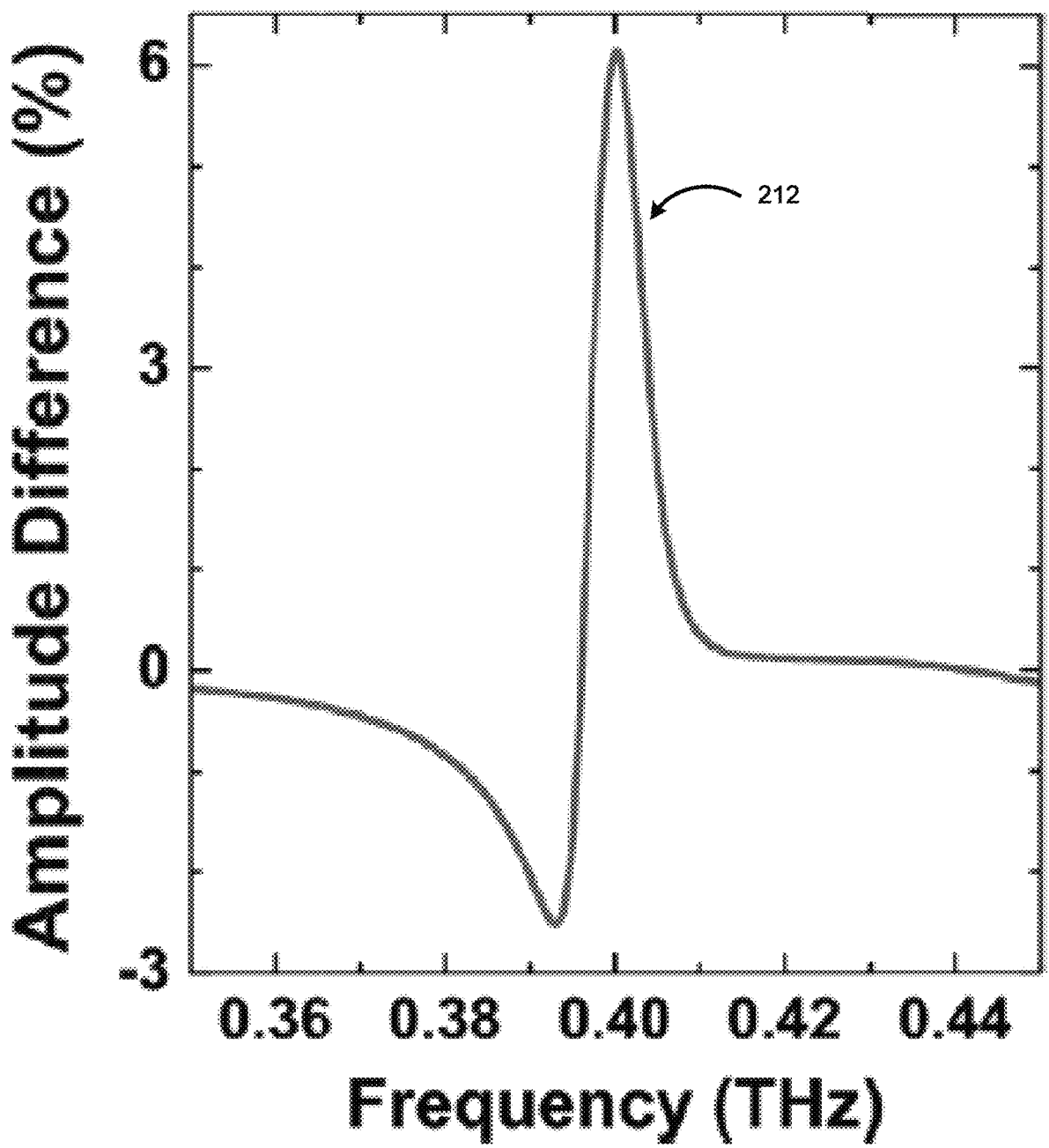
FIG. 2B illustrates the amplitude difference referencing technique used with the uncoated metasurface response as a reference.

However, the amplitude difference referencing technique (ADRT) of the present disclosure may be used to resolve the frequencies to a high degree of accuracy. In the amplitude difference referencing technique the frequency response of uncoated metasurface is subtracted from the frequency response of the coated metasurface without the normalization used in the conventional method. The result (line 212) exhibits a very clear amplitude difference signature as shown in FIG. 2B. The peak-to-peak difference is 8.6%, which can easily be measured and differentiated from the noise floor using either conventional terahertz time-domain spectrometers or state-of-the-art systems with a dynamic range of 90 dB. (See Vieweg, N., Rettich, F., Deninger, A., Roehle, H., Dietz, R., Gabel, T., Schell, M., 2014. "Terahertz-time domain spectrometer with 90 dB peak dynamic range". J. Infrared Millimeter Terahertz Waves 35, 823-832, incorporated herein by reference in its entirety). This result confirms that the amplitude difference referencing technique is able to detect the frequency responses of biomolecules using analyte thicknesses is in the range of sub-microns.

Figure 3B:
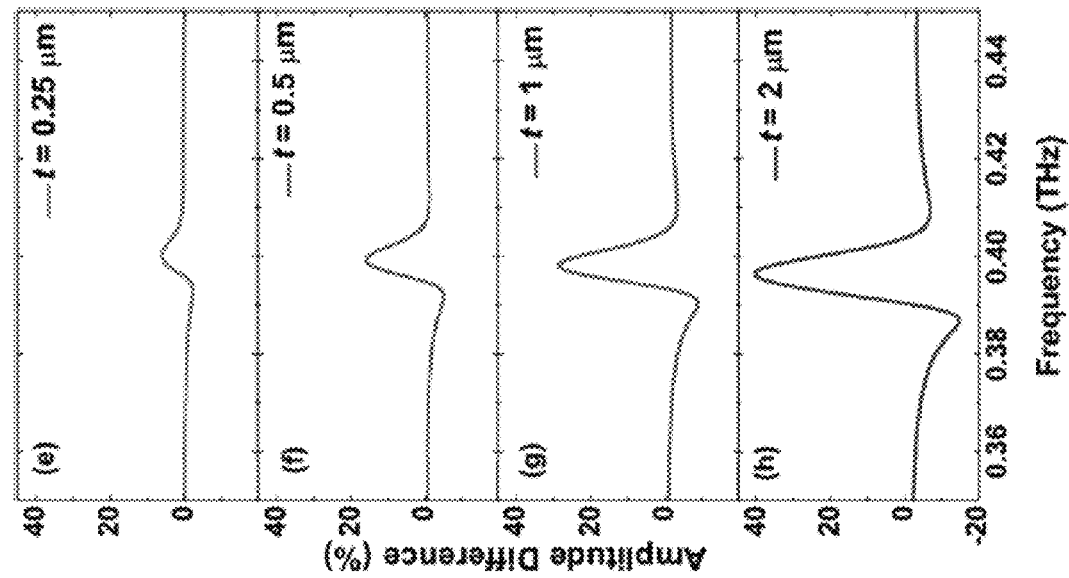
FIG. 3B is a graph illustrating the amplitude difference referencing technique for different submicron thickness values of analyte deposited on the metasurface.
Figure 3A:
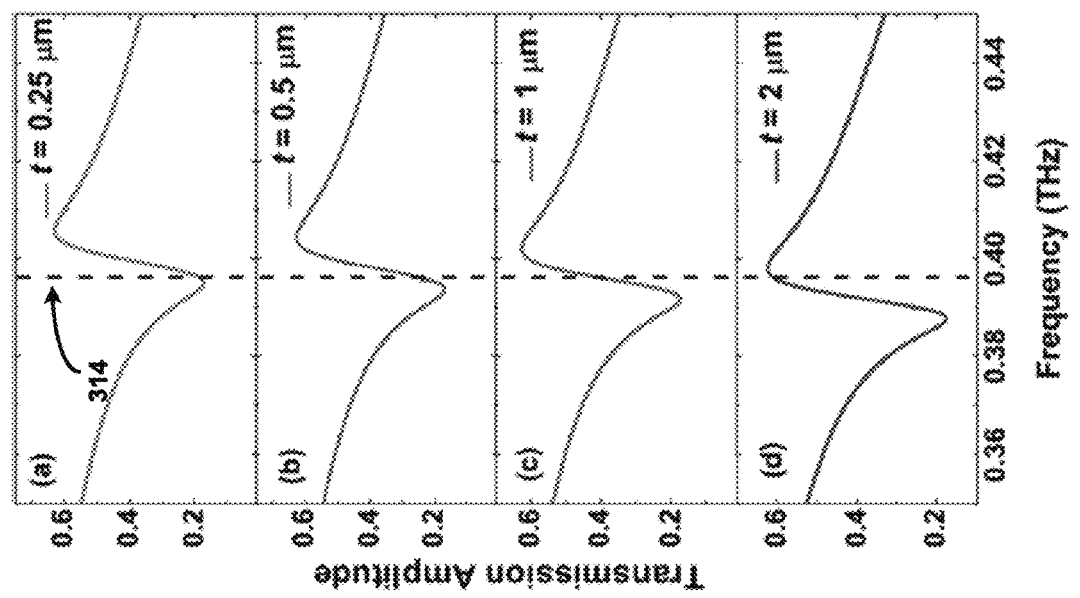
FIG. 3A is a graph illustrating the transmission amplitude spectra using the conventional testing method for different submicron thickness values of analyte deposited on the metasurface.

In order to further evaluate the amplitude difference referencing technique, transmission amplitude spectra for analyte thicknesses of 0.25, 0.5, 1, and 2 µm are compared between the conventional normalization method (FIG. 3A(a-d)) and the ADRT (FIG. 3B(e-h)). The vertical dashed line 314 shows the location of the Fano resonance dip for the uncoated metasurface, i.e. without the analyte. FIG. 3A(a-d)) show the normalized transmission amplitude where the small red-shift increases with the increase in the analyte thickness. The corresponding red-shift in the frequency response is 1, 2, 6, and 9 GHz, respectively, which results are very hard to determine accurately. For a larger analyte thicknesses of 5 µm, 10 µm, and 15 µm (not shown), the red-shift increased to 14.5, 18.6, and 20.1 GHz, respectively. Although the conventional normalization method performs poorly below 2 µm, it may be useful for analyte thickness of 2 µm or more. On the contrary, the ADRT shows a large amplitude difference for the same range of the analyte thickness as shown in FIG. 3(e)-(h) ranging from 8.6% to 55.8% for analyte thicknesses of 0.25 µm to 2 µm, respectively, which results are easily detectable and measurable.

This large amplitude difference represents the significant steepness of the flank of the amplitude response. For instance, the steepness (the frequency derivative) of the amplitude response of the uncoated sample is 6.3% per GHz (see FIG. 2B), which results in an amplitude difference of 37% for an analyte thickness of 1 µm as shown in FIG. 3B(g). Therefore, decreasing the steepness of the amplitude response leads to a decrease in the amplitude difference. This can be demonstrated by increasing the asymmetry distance from the center line, d, of the asymmetric split-rectangular resonator to be 20 µm instead of 5 µm. In this case, the steepness of the amplitude frequency response decreases to 1.6% per GHz. After analyzing the amplitude response of the coated sample with 1 µm analyte, the amplitude difference was found to be 18%.

Figure 4A:
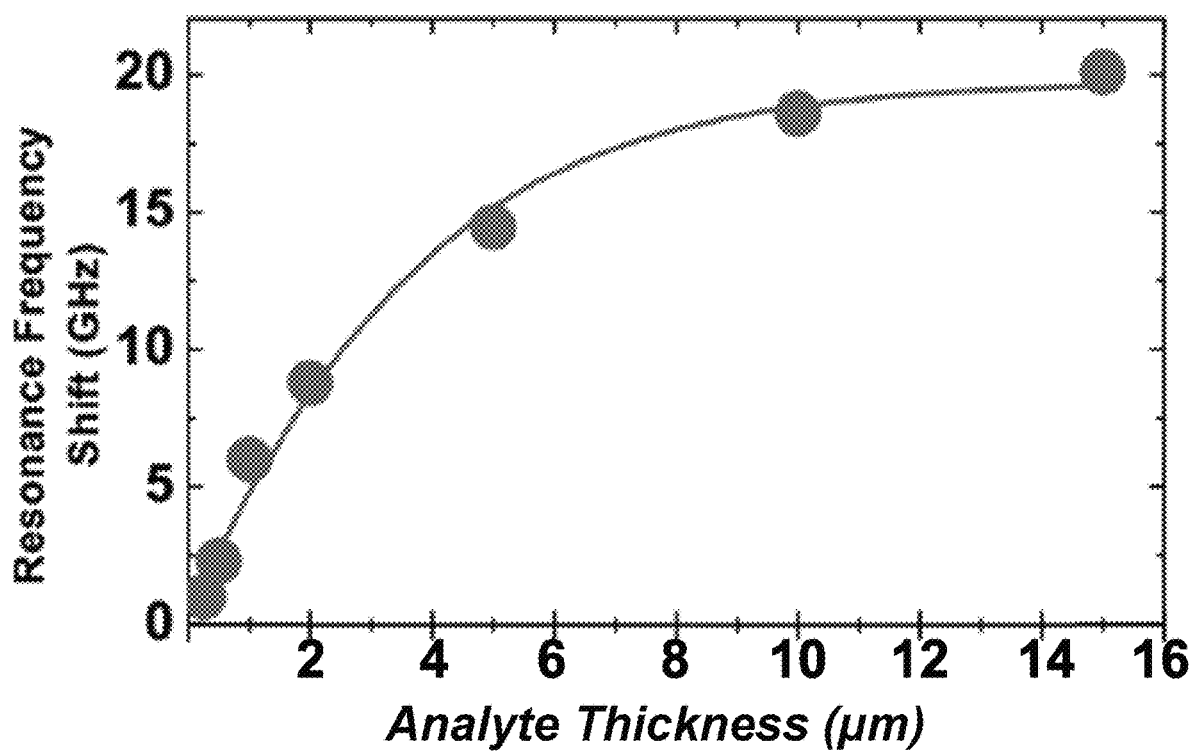
FIGS. 4A and 4B are graphs illustrating (A) Fano resonance frequency shift and (B) peak-to-peak amplitude difference versus analyte thickness.
Figure 4B:
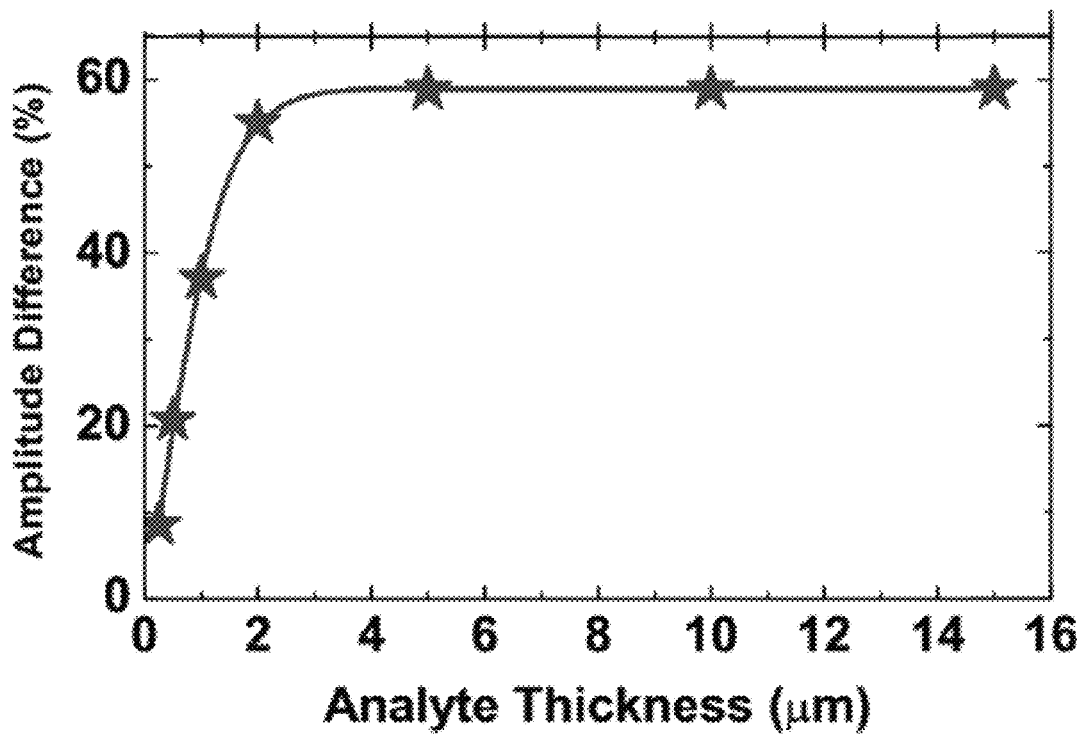

The performance of the conventional normalization method versus the ADRT for a wide range of the analyte thickness between 0.25 µm and 15 µm is shown in FIGS. 4A and 4B. FIG. 4A shows the resonance frequency shift and the peak-to-peak amplitude difference using the conventional normalization method and FIG. 4B shows the results found using the amplitude difference referencing technique, both as a function of the analyte thickness, respectively. The relationship between the resonance frequency red-shift and the analyte thickness is exponential for small thicknesses less than 5 µm and gradually reaches a saturated value as revealed in FIG. 4A.

In contrast, saturation using the ADRT takes place for analyte thicknesses greater than 2 µm as shown in FIG. 4B. This saturation is attributed to the fact that the amplitude difference value cannot be more than the difference between the peak and the dip of the amplitude response near resonance. It is evident from these results that the ADRT advantageously resolves frequency response for sub-micron analyte thickness below 2 µm.

TABLE I

Raw data of FIG. 4B

| Analyte Thickness | Shift in GHz | Peak-to-peak Amplitude Difference |
|---|---|---|
| 0.25 | 1 | 8.6 |
| 0.5 | 2.3 | 20.7 |
| 1 | 6 | 37 |
| 2 | 8.8 | 55 |
| 5 | 14.45 | 58.9 |
| 10 | 18.6 | 59 |
| 15 | 20.1 | 59 |

It is clear that the shift in GHz is very small when the analyte thickness is sub-micron using the conventional method. However, the peak-to-peak amplitude difference is significant and can be easily evaluated.

Figure 5:
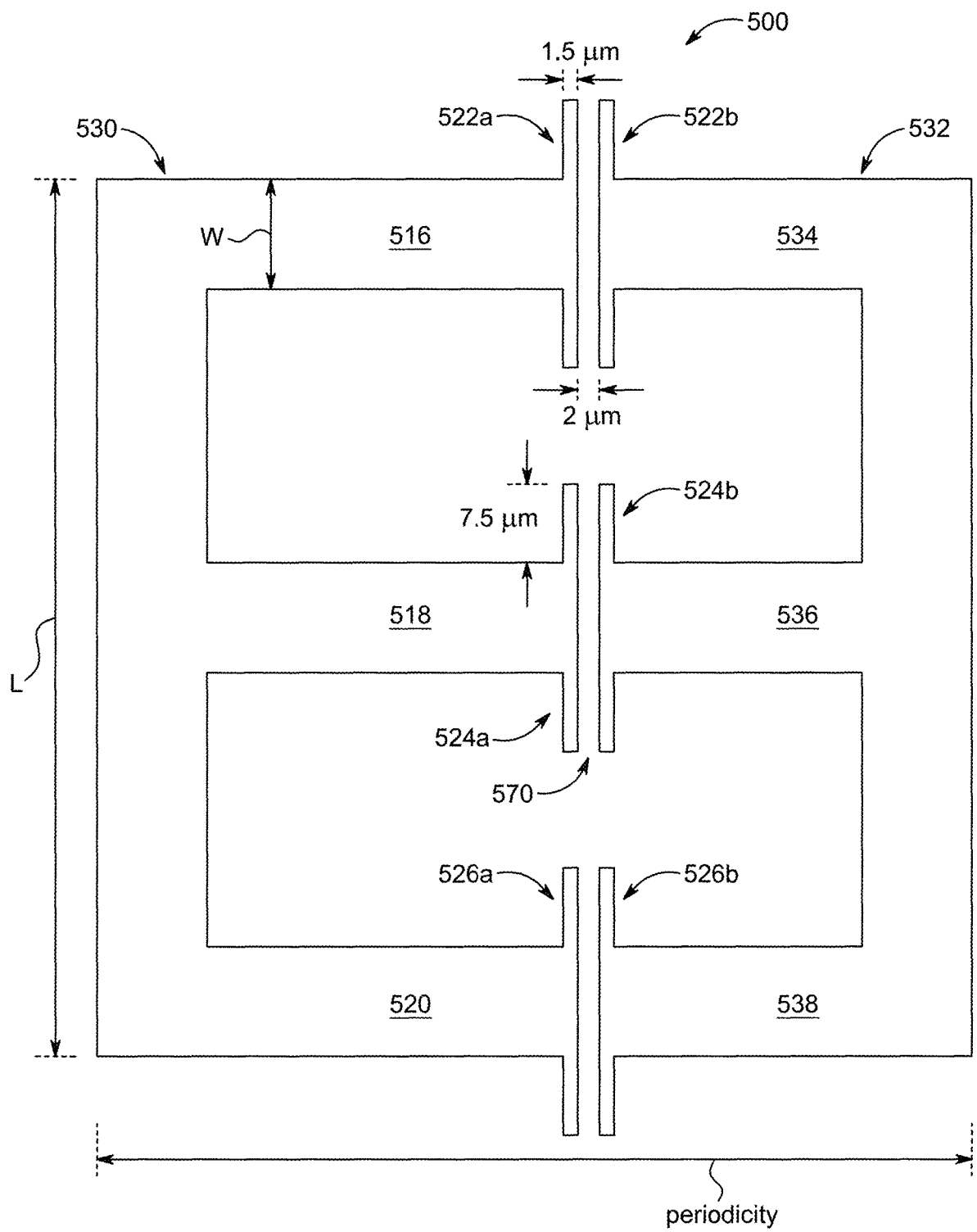
FIG. 5 illustrates an asymmetric triple split-rectangular (ATSR) metamaterial unit cell.
Figure 6:
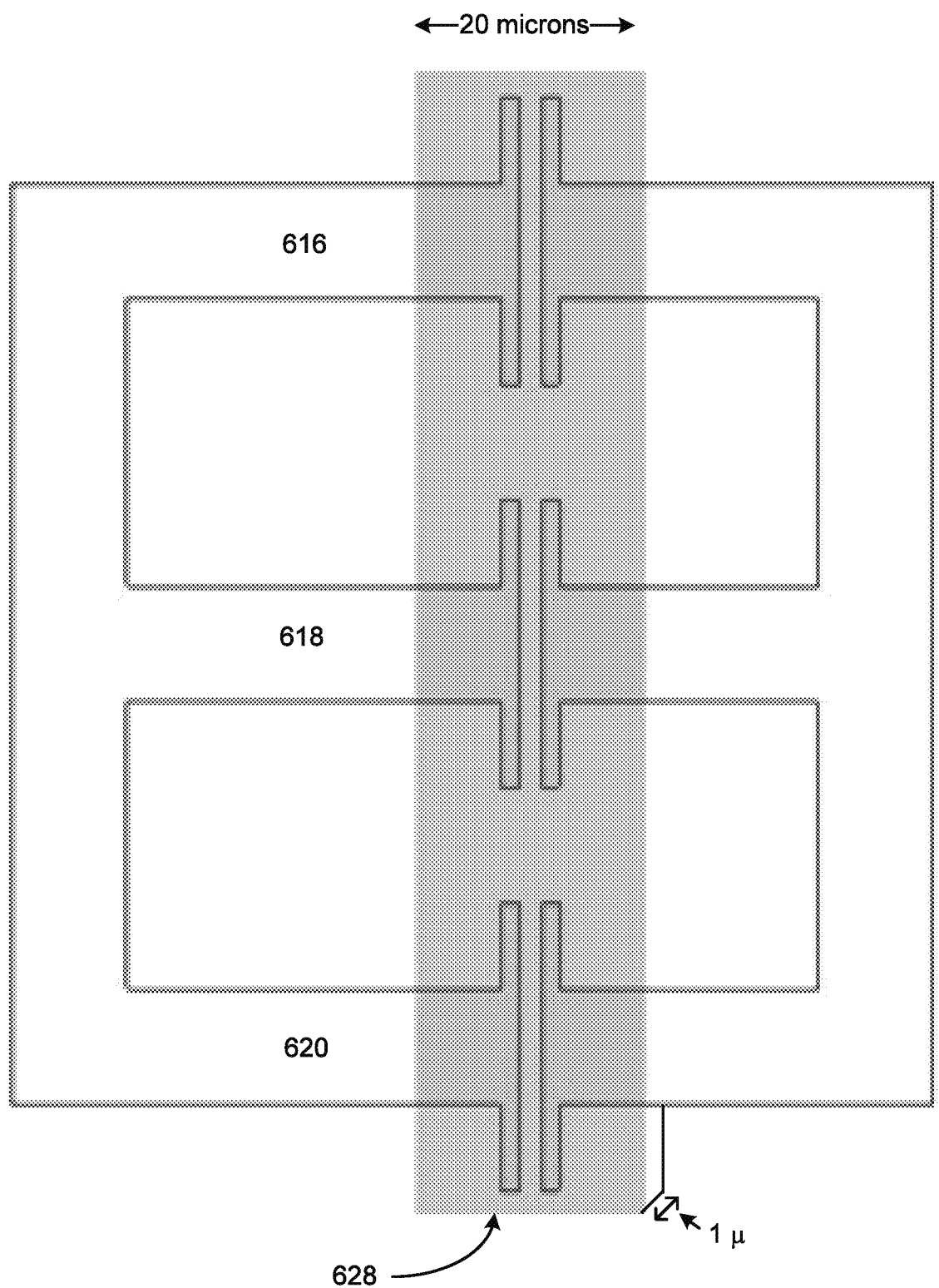
FIG. 6 is the asymmetric triple split-rectangular (ATSR) metamaterial unit showing the position at which the analyte is applied.

The aspect of the present disclosure describing an improved biosensor design is shown with respect to FIG. 5. The asymmetric triple split-rectangular (ATSR) metamaterial biosensor improves the confinement of the spatial electric field over the sensor design of FIG. 1B. This sensor is deposited by photolithography upon a high resistivity silicon substrate wafer and the metalized metamaterial resonators may be made of gold, similarly to the conventional sensor cell of FIG. 1A. The biosensor has two parts, 530 and 532. Each part has three sensor legs (516, 518, 520) shown on the left of FIG. 5 and three sensor legs (534, 536, 538) shown on the right. The left shape is an E shape and the right shape is an inverted E shape. The sensor legs are mutually oppos-ing with a small gap between their ends. In a non-limiting example and purely for explanatory purposes, the sensor legs (516, 518, 520) are each about 10 µm in width, and each leg ends in a probe (522, 524, 526) having extensions of 7.5 µm on either side of the width of the probe at its respective gap region. These additional extensions help to confine the electric field between the probes. The width of each gap is about 2 µm. In a non-limiting example, the length of legs 516, 518, 520=32.5 µm, the length of legs 534, 536, 538=22.5 µm, the width of each leg=10 µm, the periodicity=100 µm and the distance between the legs may be 2 µm (asymmetry distance from the center line of d=5 µm). As shown in the FIG. 6, it is not necessary to cover the entire area of the sensor with the analyte, but only the parts of the sensor near the gaps. In FIG. 6, about 20% of the sensor area has been coated with the analyte. In a non-limiting example, the width 628 of the analyte is about 20 µm and its thickness is 1 µm. Thus, only one fifth of the amount of analyte material used by the conventional sensor is needed to achieve an approximately 34% amplitude difference as opposed to the 37% amplitude difference using the asymmetric double split-rectangular (ASR) metamaterial sensor. This is an important achievement, as often only a tiny amount of analyte may be available for testing after extraction from cancerous cells or biomolecules. The substrate may further include a raised ridge (not shown) around the first and second part to receive the analyte. A raised ridge may be formed of silicon dioxide or other inert material. Alternatively, a microfluidic channel may be employed to contain the analyte on the metamaterial. The analyte may be dropped onto the metamaterial structure, pumped, pipetted, applied in sheet form, or any other method of application as is conventionally known. A microfluidic pumping method of applying analyte may be used. (See Geng et al., "A Route to Terahertz Metamateri al Biosensor Integrated with Microfluidics for Liver Cancer Biomarker Testing in Early Stage", Scientific Reports, Vol. 7, pp. 1-11, https://www.nature.com/articles/s41598-017-16762-y.pdf, incorporated herein by reference in its entirety).

Figures 7A, 7B:
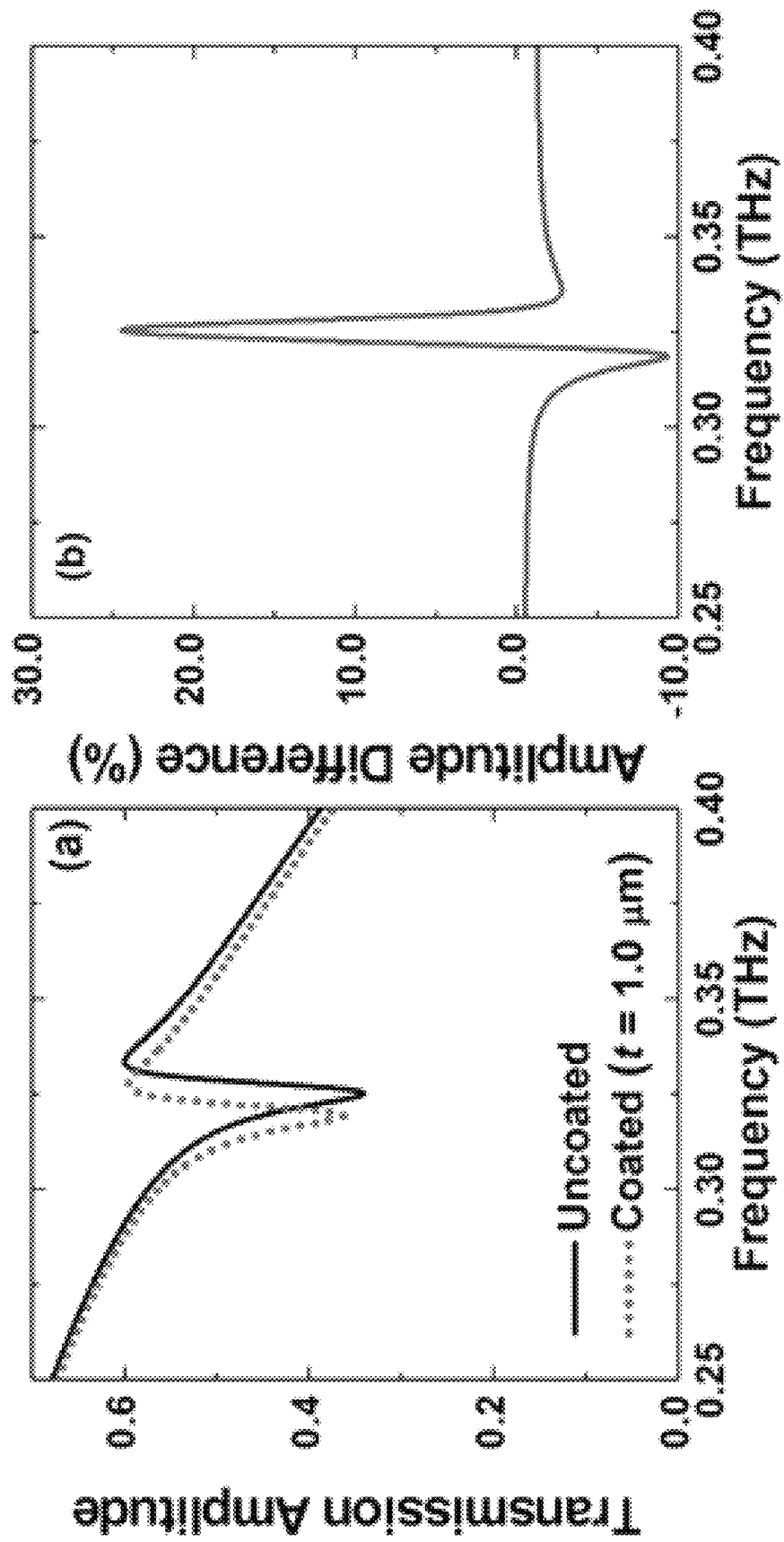
FIG. 7A shows the transmission amplitude frequency response for the ATSR.
FIG. 7B shows the amplitude difference for the ATSR.

FIG. 7A, 7B illustrate a simulation using both the conventional normalization method with the ATSR and the ADRT with the ATSR. FIG. 7A shows that the using the ATSR provides a clearer frequency separation than the conventional normalization method. Further, iIt is evident from FIG. 7B that the peak-to-peak amplitude difference using the ATSR and the ADRT with only 20% of the metastructural surface covered is almost 34%, while it was 37% when using the ADRT with conventional probe (see FIG. 3B(g) with the entire metastructural surface structure was covered with the analyte. In summary, the asymmetric triple split-rectangular (ATSR) metamaterial biosensor with only 20% of the surface area covered with analyte performs comparably to the conventional biosensor fully covered with analyte. This result is of great benefit in analysis of biomolecules as only one-fifth as much biomaterial must be taken from the patient in a biopsy or other analysis procedure.

In conclusion, the biosensor design of FIG. 6 offers a better electric field confinement compared to conventional designs. Moreover, only 20% as much analyte is needed to achieve similar results. Further, the ADRT analysis method yields much better resolution for analyte thicknesses below 2 µm.

As the refractive index of different biomolecule analytes ranges from 1.4 to 1.6 in DNA and 1.6 to 2.0 in RNA, an average value of the analyte refractive index of 1.6 was chosen for the purpose of the analysis. (See Yahiaoui, R., Strikwerda, A. C., Jepsen, P. U., 2016. "Terahertz plasmonic structure with enhanced sensing capabilities". IEEE Sens. J. 16, 2484-2488, incorporated herein by reference in its entirety). In the conventional normalization method, the refractive index may be determined by measuring the resonant frequency shift of a known thickness of analyte. The refractive index may be referenced to a table or database of lookup values to identify the analyte. When the sample is thinner than one micron, the sensitivity will be very low as shown in FIG. 3A and may lead to an incorrect identification of the analyte. Conversely, the amplitude difference referencing technique (ADRT) uses the amplitude difference and it is evident from the results shown in FIG. 3B and FIG. 7(b) that it is far more sensitive to a small variation in refractive index when the analyte thickness is less than two micron.

Figure 8A:
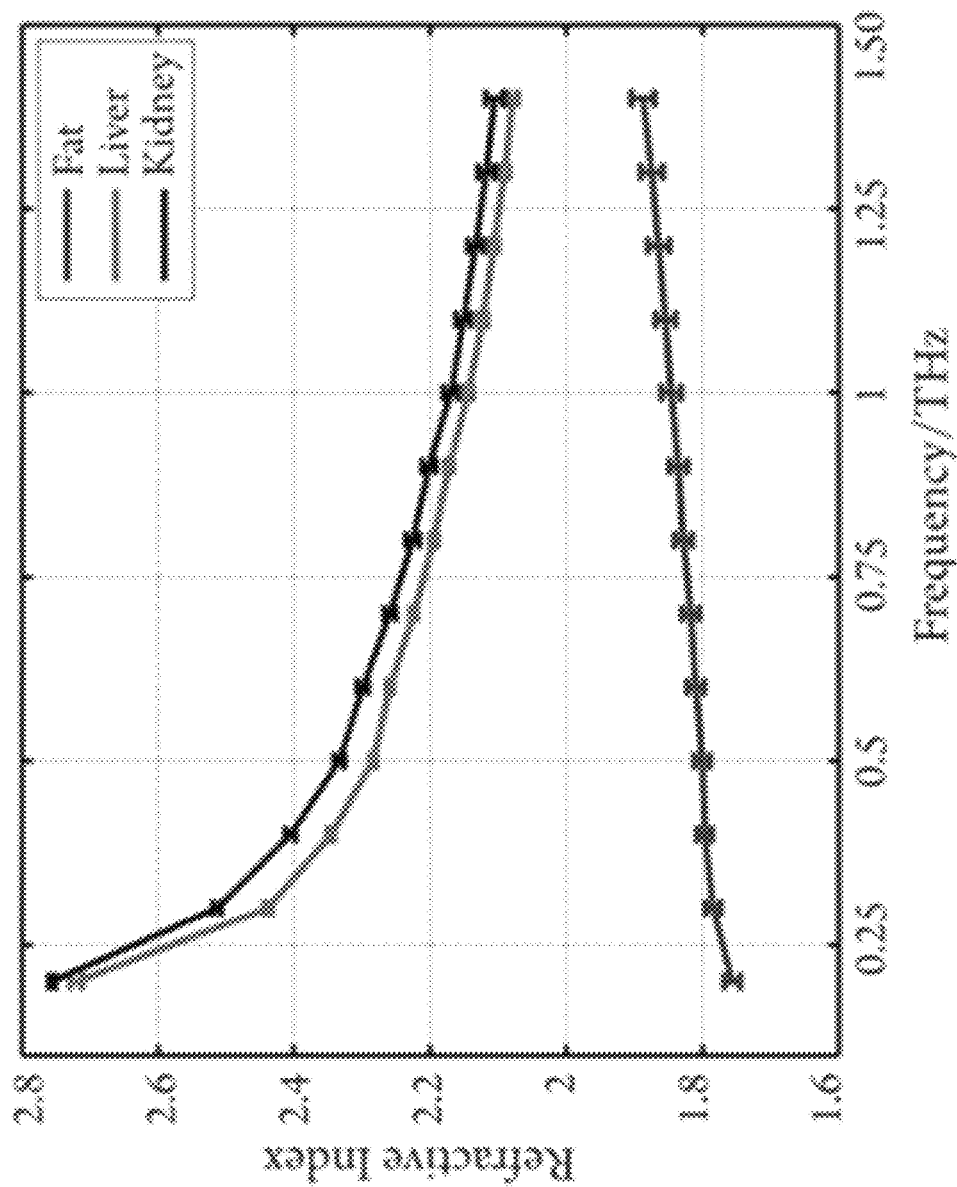
FIG. 8A illustrates the mean refractive indices of tissue samples.

FIG. 8A depicts the refractive indices of fat, liver and kidney tissue samples versus frequencies ranging from 0.25 to 1.5 THz. This graph shows that the refractive index may be used to identify the type of cell. (See Yu et al., "The potential of terahertz imaging for cancer diagnosis: A review of investigations to date", Quant Imaging Med Surg. 2012 March; 2(1): 33-45, incorporated herein by reference in its entirety).

Further, it is noted that tryptophan is a good biomarker for skin tumor diagnosis. Tryptophan has resonant absorptions at 1.42 and 1.84 THz. These resonances may be used to identify skin cancer cells by using the asymmetric triple split-rectangular (ATSR) metamaterial biosensor with the amplitude difference referencing technique (ADRT).

Terahertz time domain spectroscopy (THz-TDS) has been conventionally used to take the measurements. THz-TDS offers the complete time domain response in one shot, i.e. the entire frequency response from the measured time-domain response may be determined. The measurement time is on the order of 10-20 minutes, depending on the required resolution.

In a non-limiting example, the THz-TDS device may be the TERA K15, All fiber-coupled Terahertz Spectrometer, manufactured by Menlo Systems Inc., 56 Sparta Avenue, Newton, N.J. 07860, US, https://www.menlosystems.com/products/thz-time-domain-solutions/all-fiber-coupled-terahertz-spectrometer.

Figure 8B:
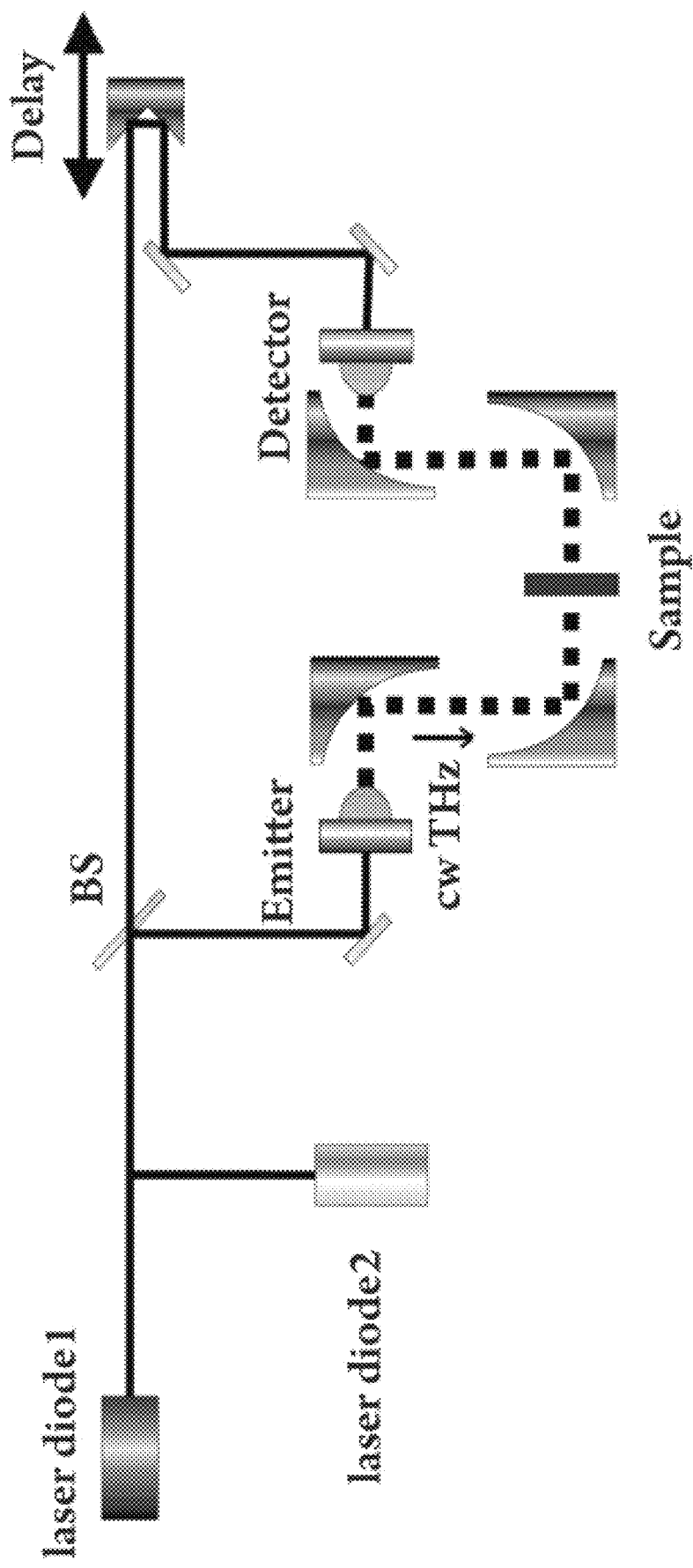
FIG. 8B illustrates a CW THz laser system which may be used to perform the exemplary sensing.

However, as shown in FIG. 3(e)-(h), a complete frequency response is not needed to calculate the amplitude difference as the peak (using a refractive index of 1.6) localized around 0.4 THz. Hence, we can use THz continuous wave systems (THz-CW). These systems are much more affordable than their THz-TDS counterparts as they rely on 1550 nm communication lasers, which make the whole measurement system much more cost effective. Moreover, the THz-CW device is more compact and reliable. In a non-limiting example, a CW THz laser may be the CW THz Laser manufactured by Sacher Lasertechnik, LLC, 5765 Equador Way, Buena Park, Calif. 90620, U.S.A https://www.sacher-laser.com/home/scientific-lasers/thz_tera_hertz_generation/tera_hertz/tec_450_thz_generation.html. A CW THz laser system which may be used to interrogate the biosensor is shown in FIG. 8B.

Figure 9:
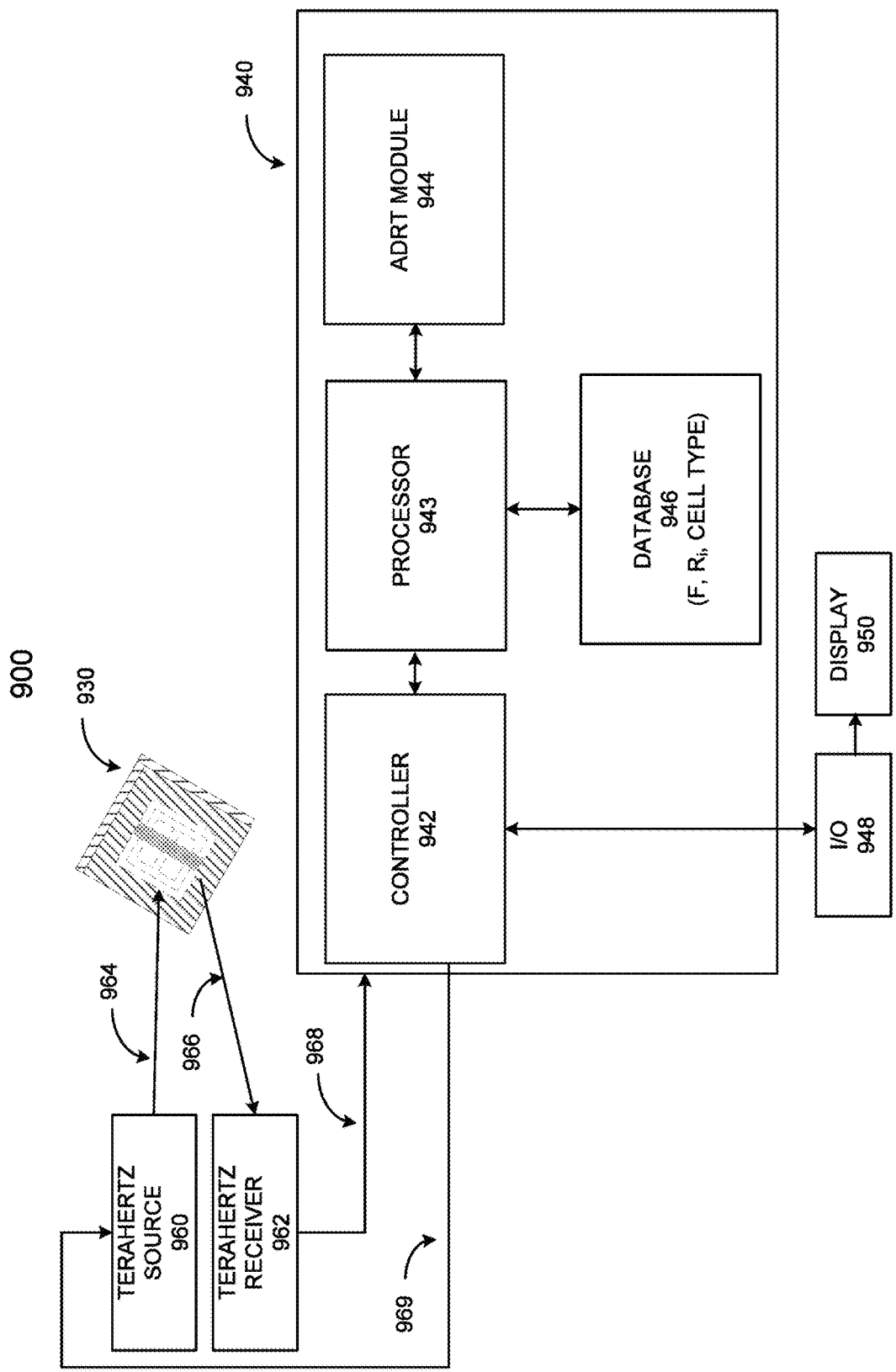
FIG. 9 depicts the terahertz measurement system.

The terahertz imaging system of the present disclosure is shown in FIG. 9. FIG. 9 depicts a terahertz source 960 which generates a teraherz wave 964 in a range of frequencies onto an asymmetric triple split-rectangular (ATSR) metamaterial biosensor 930 having an analyte applied upon it. The biosensor responds with a set of electrical signals 966 that are modified by the analyte at the gaps of the sensor which are received by the terahertz receiver 962. The terahertz receiver 962 is connected to control system 940 having a controller 942, a processor 943 connected to the controller, an ADRT module 944 and a database 946 which holds a record of the relationship of an amplitude difference response to a refractive index of a biomolecule and the biomolecule type. The database may also include frequency responses of biomolecules based on analyte thickness. The processor 943 sends terahertz signals to the ADRT module for frequency analysis and references the database 946 to identify the cell type. The identification is sent to the controller, which transmits data to an I/O port 948 for display (950), printing (not shown), and the like.

The first embodiment is illustrated with respect to FIGS. 1A, 5, 6 and 9. The first embodiment describes a system for biomolecule identification by terahertz sensing, comprising an asymmetric triple split-rectangular (ATSR) metamaterial biosensor 500 having a substrate 104; a metamaterial structure formed on the substrate, the metamaterial structure including three mutually opposed gaps 570 which form a sensing domain. An unknown analyte 102 may be deposited on the metamaterial structure. The analyte may be a film, a film coated with a biomolecule sample, such as blood or biopsy tissue, a thin layer of biomolecule dropped, pipetted, pumped or otherwise placed on the sensing domain, etc.

A terahertz radiation source 960 having a range of frequencies for interrogating the asymmetric triple split-rectangular metamaterial biosensor and a terahertz receiver 962 for receiving electrical signals generated at the gaps are included in the system. The system further includes a database 946 with records having a list of resonant frequencies for a plurality of different analyte types and a controller 942 having circuitry configured to cause the terahertz radiation source 964 to project terahertz radiation at a range of frequencies onto the unknown analyte 102; receive the terahertz frequency response from the receiver 962, and determine an amplitude difference from the frequency responses of the asymmetric triple split-rectangular metamaterial biosensor by an amplitude difference referencing technique; and match the resonant frequency to the database record to identify the analyte or biomolecule type.

The substrate 104 is one of a high resistivity silicon substrate wafer or a sapphire wafer.

The metamaterial biosensor includes a first E shaped sensor part 530 having three evenly spaced legs (516, 518, 520) each of length/and a second inverted E shaped sensor part 532 having three evenly spaced legs (534, 536, 538) of length k, where l is greater than k and l and k are each less than 80 μm. Each leg of the first E shaped sensor part includes a first end connected at a right angle to a back of the E shape and a second end having two perpendicular extensions (shown as 522, 524, 526 on the second part) in the plane of the sensor; and wherein each leg of the second inverted E shaped sensor part includes a third end connected at a right angle to a back of the inverted E shape and a fourth end having two perpendicular extensions (522, 524, 526) in the plane of the sensor.

The extension end of each leg of the E shaped sensor mutually opposes the extension end of a corresponding leg of the inverted E shaped sensor as shown in FIG. 5; and each extension end of the E shaped sensor is separated from the corresponding extension end of the inverted E shaped sensor by a gap 570.

The gaps confine the electric field between the extension ends and the frequency response is measured at the gaps.

An analyte applied to the sensing domain may have a thickness in the range of 0.1 to 2 μm.

The metamaterial is gold.

Each gap 570 may have a width of 1-3 μm, preferably 2 μm.

The analyte is one of a cancer cell, a cancer biomarker and a biomolecule.

The amplitude difference of the resonant frequencies corresponds to the refractive index of the unknown analyte and the refractive index is matched to the analyte type in the database record.

The second embodiment is illustrated with respect to FIGS. 1A, 5, 6 and 9. The second embodiment describes an asymmetric triple split-rectangular (ATSR) metamaterial biosensor, comprising a substrate 104; a first E shaped sensor part 530 deposited upon the substrate, the first E shaped sensor having three evenly spaced legs (516, 518, 520) each of length l; a second inverted E shaped sensor part 532 deposited upon the substrate, the second inverted E shaped sensor part having three evenly spaced legs (534, 536, 538) each of length k, where l is greater than k and the sum of l and k is less than 80 μm. Each leg of the first E shaped sensor part 530 includes a first end connected at a right angle to a back of the E shape and a second end having two perpendicular extensions (522a, 524a, 526a) in the plane of the sensor. Each leg of the second inverted E shaped sensor part 532 includes a third end connected at a right angle to a back of the inverted E shape and a fourth end having two perpendicular extensions (522b, 524b, 526b) in the plane of the sensor. The extension end of each leg of the E shaped sensor mutually opposes the extension end of a corresponding leg of the inverted E shaped sensor as shown in FIG. 5 and each extension end of the E shaped sensor is separated from the corresponding extension end of the inverted E shaped sensor by a gap 570.

The metamaterial is gold. The gap may be 1-3 μm, preferably 2 μm.

The substrate is one of a high resistivity silicon substrate wafer or a sapphire wafer.

The substrate further may include a raised ridge of height h which surrounds the first and second part, wherein the height h of the raised ridge is greater than a thickness of the metamaterial.

Alternatively, the substrate may include a microfluidic channel configured for receiving analyte pumped into the channel.

The third embodiment is illustrated by FIGS. 1A, 5, 6 and 9. The third embodiment describes a method for biomolecule identification by terahertz sensing, comprising transmitting, by a terahertz source 960, a terahertz wave in a range of frequencies to an asymmetric triple split-rectangular metamaterial biosensor 500 loaded with an analyte 102; receiving, by a terahertz receiver 962, a frequency response from the biosensor; transmitting the frequency response from the terahertz receiver to a sensor control system 940, wherein the sensor control system includes a controller 942 having processing circuitry 943 configured for analyzing the frequency response by an amplitude difference referencing technique 944 to determine an amplitude difference percentage; and identifying the analyte type by matching the amplitude difference percentage to a database 946 record.

Analyzing the amplitude difference percentage by the amplitude difference referencing technique comprises measuring the amplitude of the resonant frequency response of an unloaded substrate, measuring the amplitude of the resonant frequency response of the loaded substrate and subtracting the amplitude of the resonant frequency response of the loaded substrate from the resonant frequency response of an unloaded substrate.

Identifying the analyte type further comprises accessing a database record corresponding to the amplitude difference percentage, matching the amplitude difference percentage to a list of refractive indices which correspond to known analyte types, and identifying the analyte type.

For the processing circuitry, Matlab was used to post-process the data. However, for a stand-alone compact system, a Raspberry Pi single board computer or other computer system may be used for this purpose. The Raspberry pi single board computer has been used in previous sensor systems, but not in the context of biosensing. (See Gente et al., "Outdoor Measurements of Leaf Water Content Using THz Quasi Time-Domain Spectroscopy", J Infrared Milli Terahz Waves, 17 Jul. 2018, http://www.thz.org.mx/pdfs/outdoor.pdf, incorporated herein by reference in its entirety).

The present disclosure combines the ADRT testing method with a new probe sensor design. Incorporation with a THz-CW compact system, and post processing with a Raspberry Pi single board computer provides a highly effective THz biosensing product capable of detecting very small amounts of biomolecules.

In summary, the amplitude difference referencing technique has been evaluated in the present disclosure in order to sense unknown analytes with sub-micron thickness. High Q-factor Fano resonance excited via the asymmetric split ring metamaterial resonators of the conventional sensor has been utilized with the evaluation process of the ADRT and compared to the conventional normalization method. Further, an asymmetric triple split-rectangular (ATSR) metamaterial biosensor was evaluated in which only 20% of the analyte was needed to yield comparable results with those of a conventional sensor. The performance of the ATSR was evaluated for a range of analyte thicknesses. The amplitude difference achievement is impressive, considering that only sub-micron analyte thickness have been applied to the metamaterial sensor. In the future, the ATSR used with the ADRT can be utilized to identify analytes with sub-micron thickness and hence pave the way for a new generation of label-free biomedical sensors.

Obviously, numerous modifications and variations of the present invention are possible in light of the above teachings. It is therefore to be understood that within the scope of the appended claims, the invention may be practiced otherwise than as specifically described herein.

The invention claimed is:

1. A system for biomolecule identification by terahertz sensing, comprising:
   an asymmetric triple split-rectangular (ATSR) metamaterial biosensor having
      a substrate;
      a metamaterial structure formed on the substrate, the metamaterial structure including: three mutually opposed gaps which form a sensing domain, the gaps formed by:
      a first E shaped sensor part having three evenly spaced legs each of length 1 and a second E shaped sensor part having three evenly spaced legs of length 1, each leg having a length k, where 1 is greater than k and 1 and k are each less than 80 μm,
      wherein the first E shaped sensor part and the second E shaped sensor part are coplanar in the plane of the sensor such that the legs of the first E shaped sensor part and the legs of the second E shaped sensor part oppose one another and the ends of the legs of the first E shaped sensor part are separated from ends of the legs of the second E shaped sensor part by gaps;
   a terahertz radiation source having a range of frequencies for interrogating the asymmetric triple split-rectangular metamaterial biosensor;

a terahertz receiver for receiving electrical signals from the sensing domain;

a database record having a list of amplitude differences for a plurality of different biomolecule analytes;

a controller having circuitry configured to cause the terahertz radiation source to project terahertz radiation at a range of frequencies onto the sensing domain;

receive the terahertz frequency response from the receiver, and determine the amplitude difference from the frequency responses of the asymmetric triple split-rectangular metamaterial biosensor by an amplitude difference referencing technique; and match the amplitude difference to the database record to identify a biomolecule.

2. The system of claim 1, wherein the substrate is one of a high resistivity silicon substrate wafer or a sapphire wafer.

3. The system of claim 1, wherein each leg of the first E shaped sensor part ends with a first I-shaped metallic microstrip line; and wherein each leg of the second E shaped sensor part ends with a second I-shaped metallic microstrip line, the second I-shaped metallic microstrip line facing the first I-shaped metallic microstrip line in the plane of the sensor.

4. The system of claim 3, wherein each gap is configured to enhance the interaction between the sensing material and the terahertz electromagnetic field by confining the electric field between the corresponding I-shaped I-shaped metallic microstrip lines.

5. The system of claim 4, wherein the sensing domain has a thickness in the submicron range of 0.1 to 2 µm, a width of 20 µm, and covers the extensions, the gaps, and each leg.

6. The system of claim 1, wherein the metamaterial is gold.

7. The system of claim 1, wherein each gap has a width of 1-3 µm.

8. The system of claim 1, wherein the biomolecule is a cancer cell.

9. The system of claim 1, wherein the biomolecule is a cancer biomarker.

10. The system of claim 1, wherein the resonant frequency corresponds to a refractive index of an analyte, wherein the refractive index is matched to an analyte type in the database record.

* * * * *